(12) United States Patent
Hastwell et al.

(10) Patent No.: US 8,609,178 B2
(45) Date of Patent: Dec. 17, 2013

(54) SUBSTRATES FOR SPATIALLY SELECTIVE MICRON AND NANOMETER SCALE DEPOSITION AND COMBINATORIAL MODIFICATION AND FABRICATION

(75) Inventors: Peter John Hastwell, North Adelaide (AU); Timothy Mark Kaethner, Crafers (AU)

(73) Assignee: Raustech Pty Ltd, South Australia (AU)

( * ) Notice: Subject to any disclaimer, the term of this patent is extended or adjusted under 35 U.S.C. 154(b) by 1272 days.

(21) Appl. No.: 10/562,371

(22) PCT Filed: Jun. 30, 2004

(86) PCT No.: PCT/AU2004/000865
§ 371 (c)(1),
(2), (4) Date: Jul. 21, 2006

(87) PCT Pub. No.: WO2005/001121
PCT Pub. Date: Jan. 6, 2005

(65) Prior Publication Data
US 2007/0065822 A1     Mar. 22, 2007

(30) Foreign Application Priority Data
Jun. 30, 2003   (AU) ................................ 2003903295

(51) Int. Cl.
*H01L 21/00* (2006.01)
*C12Q 1/68* (2006.01)

(52) U.S. Cl.
USPC ......................... 427/2.11; 435/6.1; 435/267.2

(58) Field of Classification Search
None
See application file for complete search history.

(56) References Cited

U.S. PATENT DOCUMENTS

| | | | |
|---|---|---|---|
| 2,828,180 A | 3/1958 | Sertorio | |
| 3,347,702 A | 10/1967 | Clancy | |
| 4,265,990 A * | 5/1981 | Stolka et al. | 430/58.8 |
| 5,289,214 A | 2/1994 | Zur | |
| 5,929,208 A | 7/1999 | Heller | |
| 6,184,608 B1 * | 2/2001 | Cabuz et al. | 310/309 |
| 6,187,149 B1 | 2/2001 | Sun | |
| 6,350,609 B1 * | 2/2002 | Morozov et al. | 506/16 |

(Continued)

FOREIGN PATENT DOCUMENTS

| | | |
|---|---|---|
| EP | 1 354 630 A1 | 10/2003 |
| WO | WO 0023182 | 4/2000 |

(Continued)

OTHER PUBLICATIONS

Schaffert, "Electrophotography", *The Focal Press Limited*, 1965, 13 pgs.

(Continued)

*Primary Examiner* — Stephanie K Mummert
(74) *Attorney, Agent, or Firm* — Brinks Gilson & Lione

(57) ABSTRACT

A substrate (1) for spatially selective micron and nanometer scale deposition and/or reaction, which has a support (3), a conductive layer (5) on the support, a dielectric layer (7) to hold an electrostatic charge pattern such as a photoconductive layer of a material which dissipates an electric charge upon receiving incident radiation thereon, and a chemically functional layer (9), such that electrostatic charge patterns may be formed in a predetermined manner upon the substrate to influence the movement of charged droplets in an emulsion (15) on the substrate. The chemically functional layer either provides a surface for chemical functionalization of the substrate or prevents access or reaction to the dielectric or photoconductive layer.

20 Claims, 3 Drawing Sheets

(56) References Cited

U.S. PATENT DOCUMENTS

| | | |
|---|---|---|
| 6,855,501 B2 | 2/2005 | Huang |
| 2002/0094528 A1* | 7/2002 | Salafsky .......................... 435/6 |
| 2002/0136978 A1* | 9/2002 | Huang .......................... 430/126 |
| 2004/0050701 A1* | 3/2004 | McEntee et al. .............. 204/465 |

FOREIGN PATENT DOCUMENTS

| WO | WO00/25936 | * | 5/2000 | .............. C12Q 1/68 |
|---|---|---|---|---|
| WO | WO 00/25936 A1 | | 5/2000 | |
| WO | WO 01/15800 A1 | | 3/2001 | |
| WO | WO 03/031067 A1 | | 4/2003 | |

OTHER PUBLICATIONS

Davis, "The Application of Image Orthicon Techniques to Auroral Observation", *Geophysical Institute, University of Alaska,* Jun. 1966, 26 pgs.

* cited by examiner

SUBSTRATES FOR SPATIALLY SELECTIVE MICRON AND NANOMETER SCALE DEPOSITION AND COMBINATORIAL MODIFICATION AND FABRICATION

FIELD OF INVENTION

This invention relates to a substrate having a surface for selective micron and nanometer scale deposition with or without reaction such as for combinatorial chemistry or for fabrication thereon.

BACKGROUND OF THE INVENTION

The invention will be generally discussed in relation to substrates for use in manufacture of DNA arrays, of the type generally known as DNA chips, on substrates particularly planar substrates but the invention is not limited to that particular application but has wider ramifications and the invention is not intended to be limited to the manufacture of such DNA chips. Other physical or chemical reactions include manufacture of printed circuits, flat panel displays, semiconductor chips, nanotechnology, micro-electromechanical systems, flexible printed circuits, protein chips and lab-on-a-chip microfluidics.

In its broadest form the invention relates to substrates which can be used for spatially defined deposition of any of a wide variety of chemical substances onto the substrates. Substances may include, but are not limited to, coloured materials, dyes, metals, drug molecules, polymers, catalysts, anti-wetting agents, pigments, etching chemicals, layerings and reagents for de-blocking, blocking, derivatisation and activation of solid phase chemical groups. Arrays can include deoxyribonucleic acids (DNA), peptides, peptidenucleic acids (PNA), ribonucleic acids (RNA) and other solid phase chemical arrays and arrays assembled by combinatorial chemistry.

In general the manufacture of DNA chips involves the selective and sequential addition onto a substrate, of molecular units each with a protective group which is removed when the next molecular unit is to be added. One such method of manufacturing DNA arrays uses a process known as the phosphoramidite process which uses a trityl group or derivatives of the trityl group as the protective group. The invention is not limited to this process but will be discussed with respect to it.

The phosphoramidite process is a repetitive four stage process (deprotection, coupling, capping and oxidation) for the chemical synthesis of polymers particularly sequences of DNA oligonucleotides to form portions of DNA.

In the phosphoramidite process, a portion of DNA in single stranded form is built up by the sequential addition of one of the four nucleotides (coupled in phosphoramidite form) being the four components which make up DNA, the A, T, G and C nucleotides. Each terminal nucleotide has a chemically removable protecting group on it. A chemical reagent known as a de-protecting agent removes the protecting group exposing a reactive hydroxyl group and in the next stage a nucleoside (in phosphoramidite form) is coupled to the growing DNA string. The next stage is a capping step where any DNA strings which were de-protected but to which a nucleotide was not coupled are permanently capped to prevent unwanted nucleotides from adding to that molecule in later coupling steps. In the final step, oxidation of the newly formed internucleotide phosphite linkage is carried out to convert the linkage to a phosphotriester. Typically, the de-protecting agent is dichloroacetic or trichloroacetic acid.

In the manufacture of DNA arrays, a number of different sequence DNA strands are built up on a substrate to enable biochemical analysis to take place. In this process it is necessary to selectively de-protect various portions, termed features, of the array and it is particularly to the requirement for this selective de-protecting that one particular embodiment of substrate of the present invention is directed.

Selective de-protecting by direct light activated chemistry or photo-removable de-protecting techniques has been developed but these are somewhat inefficient resulting in short solid phase oligodeoxynucleotides, 20 to 25 nucleotides in length, in rather large unit feature sizes of 10 to 50 microns and it is an object of this invention to provide a more efficient chemical de-protecting process.

The applicant has surprisingly found that by the use of electrically charged emulsions which include the chemical de-protecting agent in the discontinuous phase and which are selectively deposited on predefined areas of a planar or other shaped substrate under the influence of an electric field, then more accurate, localised and efficient de-protecting may be possible.

BRIEF DESCRIPTION OF THE INVENTION

In one form therefore, the invention is said to reside in a substrate adapted for combinatorial chemistry, the substrate having;
  a support;
  a conductive layer on the support;
  a dielectric layer of a material which will hold an electric charge; and
  a chemically functional layer;
  whereby electrostatic charge patterns may be formed in a selected array upon or in the substrate.

In a further form the invention is said to reside in a substrate adapted for combinatorial chemistry, the substrate having;
  a support;
  a conductive layer on the support;
  a photoconductive layer of a material upon which an electric charge can be formed and selectively dissipated; and
  a chemically functional layer;
  whereby electrostatic charge patterns may be formed in a selected array upon the substrate to influence the movement of charged droplets in a medium on the substrate.

In a further form the invention is said to reside in a substrate adapted for combinatorial chemistry, the substrate having;
  a support;
  a conductive layer on the support;
  a photoconductive layer of a material which dissipates an electric charge thereon upon receiving incident radiation; and
  a chemically functional layer;
whereby electrostatic charge patterns may be formed in a selected array upon the substrate to influence the movement of charged droplets in a medium on the substrate.

In an alternative form the invention may be said to reside in a substrate adapted for manufacture of DNA arrays, the substrate having;
  a support;
  a conductive layer on the support;
  a photoconductive layer of a material which dissipates an electric charge thereon upon receiving incident radiation; and
  a chemically functional layer;
whereby electrostatic charge patterns may be formed in a selected array upon the substrate to influence the movement of charged droplets in a medium on the substrate;

the chemically functional layer comprising at least in part a chemically active material to which a binder molecule can be attached, whereby a selected electric charge pattern may be generated upon the substrate by incident radiation to cause DNA oligomers to selectively join to selected binder molecules or to DNA oligomers already joined to a binder molecule.

In an alternative form the invention may be said to reside in a substrate adapted for manufacture of DNA arrays, the substrate having;
 a support;
 a conductive layer on the support;
 a photoconductive layer of a material which dissipates an electric charge thereon upon receiving incident radiation; and
 a chemically functional layer,
whereby electric charge patterns may be formed in a selected array upon the substrate to influence the movement of charged droplets in a medium on the substrate;
the chemically functional layer providing a surface to which a binder molecule can be attached.

The support may be selected from a metal, glass, ceramic, or polymeric material and the support can be either clear or opaque and either flexible or rigid.

The incident radiation may be provided from either the front or rear of the substrate.

In a preferred embodiment the conductive layer may be combined with the support.

The conductive layer may be a very thin layer and may be transparent.

The conductive layer may be vacuum-deposited onto the support.

The conductive layer may be selected from a sputtered layer of metal or indium tin oxide, or a carbon nano-tube layer.

The dielectric or photoconductive layer of material which retains an induced electric charge may be an active layer and the charge on this layer may be influenced by radiation selected from infrared, visible, ultraviolet or x-ray.

The dielectric or photoconductive layer may be of a material which is adapted to have a charge pattern formed thereon on by selective discharging an already charged surface upon incident radiation impinging thereon. The already charged surface on the substrate may be provided by a corona discharge, electron beam gun, donor roller or the like.

Alternatively the dielectric layer may be chargeable by processes such as soft lithography. Soft lithography refers to a high resolution charging technique based on transferring a pattern from a conductive elastomeric stamp to a dielectric substance with conformational contact.

The dielectric layer may be glass or a polymeric resin such as methylmethacrylate (MMA) or the like.

Where the dielectric layer is a photoconductor the material of the layer may be selected from zinc oxide, cadmium sulphide, amorphous selenium, alloys of selenium such as selenium-tellurium, lead selenide, selenium-arsenic, and the like. Additionally, there can be selected as photoresponsive imaging members various organic photoconductive materials including, for example, polyvinylcarbazole (PVK) or complexes of polyvinylcarbazole sensitised with trinitrofluorenone. There are also disclosed layered organic photoresponsive devices with aryl amine hole transporting molecules, and photogenerating layers, reference U.S. Pat. No. 4,265,990, the disclosure of which is totally incorporated herein by reference.

Examples of suitable photoconductor materials include ZnO resin dye combinations coated on metallised Mylar™ (PET polyethyleneterephthalate), vacuum evaporated cadmium sulphide on stainless steel, vacuum evaporated selenium on stainless steel belts, pure selenium, PVK or PVK photoconductor sensitised with trinitrofluorenone (TNF) or other dye.

As discussed above the photoconductor surface has a chemically functional layer applied to it and this chemically functional layer may provide the surface for chemical functionalisation of the substrate, such that deposition and/or covalent chemistry can be undertaken on its surface. Depending on the nature of the photoconductor the chemically functional layer may range in thickness from mono-molecular to fractions of a millimeter.

The chemically functional layer may be adapted to prevent access or reaction between the liquids or reagents in the emulsion and other liquids used in the process and components of the dielectric or photoconductive layer. Alternatively or in addition the chemically functional layer may be a reactive material which allows a chemical reaction with another compound at its surface to form a derivatised or functionalised surface for subsequent reaction such as with linker molecules. Alternatively the chemically functional layer may be intrinsically reactive and provide a binder function.

The chemically functional layer may be formed from a silane, silicon dioxide, silicon nitride ($Si_xN_y$), titanium dioxide, Tyzor™, cross-linked or partially cross-linked epoxy novolac resin, polymerised oligomers, cross-linked resins, functionalised parylene (a polymer of di-para-xylyene with one or more functional groups), acrylates and methacrylates which may include functional groups, multi-acrylate and methacrylate monomers, monomers which have been cross-linked with a photo-initiator and the like. Multi-acrylate and methacrylate monomers refers to monomers with a plurality of double bonds. The functional group may be an active ester, epoxy, aromatic, acid, aliphatic and hydroxyl or the like.

Formation of the chemically functional layer may be achieved using several processes, including immersion of the substrate in reactive chemicals, "painting", dip-coating, spin-coating, vacuum deposition and vapour phase deposition, wherein the chemically functional layer becomes attached by covalent bonding or by other attractive forces after solvent evaporation or curing of resins by heating, irradiation e.g., with UV light, by treatment with peroxides or catalysts or by free radical mechanisms. Such layers may be formed either in air or under an inert atmosphere such as nitrogen.

The chemically functional layer may be in the form of a planar surface or may be in the form of a matrix to provide a greater surface area to increase the number of components per unit area.

The movement of droplets in the medium on the substrate can be towards the surface such as by electrostatic attraction, movement along the surface by a combination of electrostatic attraction and repulsion between adjacent charge patterns on the surface or to enable a chemical reaction with another droplet of a chemical being moved together from a different position on the substrate. Alternatively two different types of droplets in a medium may be brought together for reaction on a charge-patterned surface.

Where the substrate according to the invention includes a photoconductive layer it is preferable that the photoconductor material is one that has a low or very low dark decay. Dark decay is the property of a photoconductor to dissipate an electrostatic charge before exposure to light or before the latent electrostatic image is used for whatever purpose.

BRIEF DESCRIPTION OF THE DRAWINGS

This then generally describes the invention but to assist with understanding reference will now be made to the accompanying drawings and examples of use of the invention.

In the drawings.

DESCRIPTION OF PREFERRED EMBODIMENTS

Figure 1:
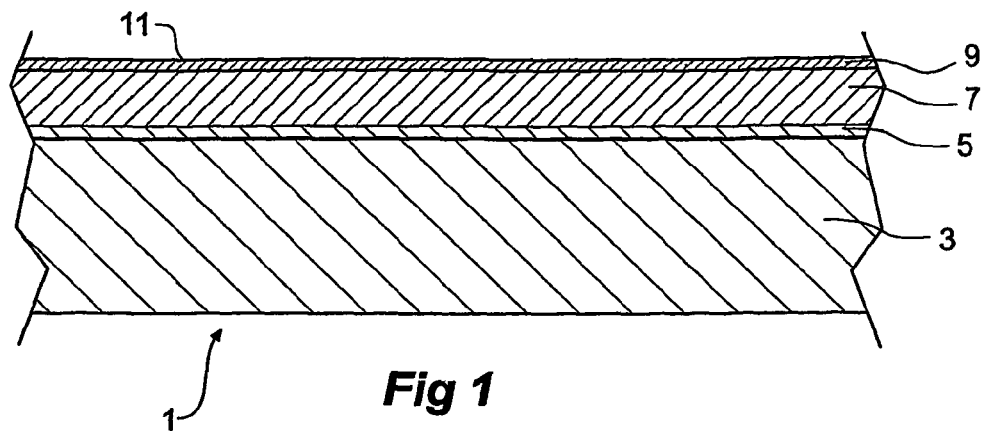
FIG. 1 shows a stylised cross sectional view of one embodiment of the invention.

Now looking more closely at the drawings it will be seen that in FIG. 1 the substrate 1 according to the invention comprises a solid support 3 which may be metal, glass, ceramic or polymeric material. The support can be either clear or opaque and either flexible or rigid. Onto the support 3 there is an electrically conductive layer 5. Where the support 3 is a metal or is itself conductive, the support 3 and conductive layer 5 may be a single layer. The conductive layer 5 can be a sputtered layer of metal or indium tin oxide. On the conductive layer 5 there is a dielectric layer 7, the dielectric layer 7 is preferably a photoconductor, that is a layer of a material which can hold an electric charge and be discharged to the conductive layer 5 when light or other electromagnetic radiation impinges upon it.

Over the surface of the dielectric layer 7 there is a chemically functional layer 9 which provides a protective layer for the dielectric layer 7 as well as providing a chemically reactive surface 11 for compounds deposited on the surface according to the various examples discussed below. The chemically functional layer 9 is preferably a silane polymer, silicon dioxide, silicon nitride ($Si_xN_y$), titanium dioxide, Tyzor™, cross-linked or partially cross-linked epoxy novolac resins, polymerised oligomers, cross-linked resins, functionalised parylene (a polymer of di-para-xylyene), acrylates and methacrylates which may include functional groups, multi-acrylates and methacrylates, or a monomer which have been crosslinked with a photoinitiator.

Figure 2:
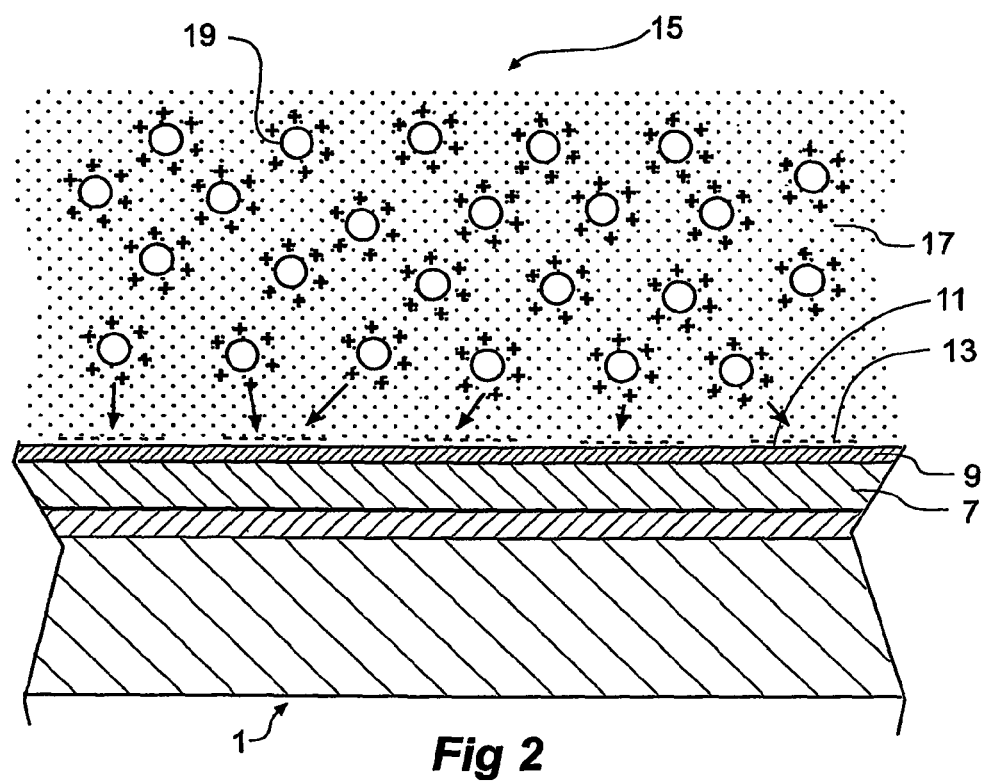
FIG. 2 shows the use of the substrate of FIG. 1 in a selective deposition process.

FIG. 2 shows one possible use of the substrate according to the present invention in a chemical deposition process. The photoconductive layer 7 has been charged negatively and then light shone onto the substrate in a pattern to discharge in some regions leaving negatively charged 13 regions. An emulsion 15 comprising a continuous phase 17 of an insulative liquid and a discontinuous phase comprising droplets 19 of a liquid comprising or incorporating a desired chemical reactant with the droplets 19 being positively charged is put onto the substrate 1.

The droplets are electrostatically attracted to the negatively charged regions of the substrate so that the desired chemical reactant can react with surface 11 of the chemically functional layer 9 in defined zones 13.

Figure 3:
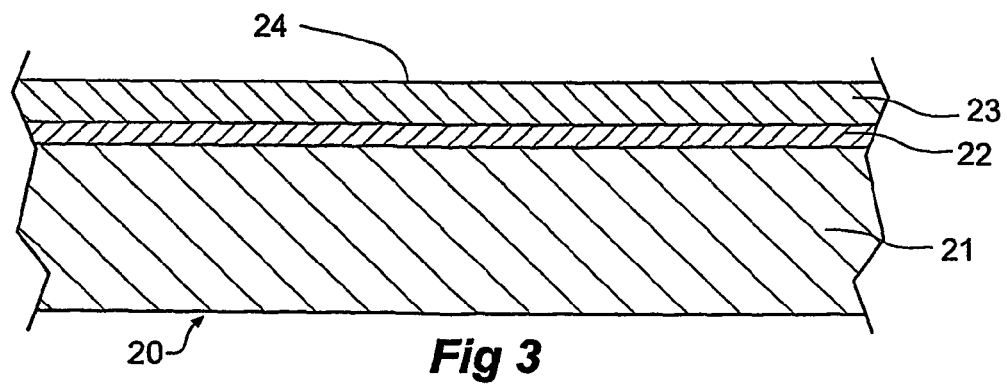
FIG. 3 shows a stylised cross sectional view of an alternative embodiment of the invention.

FIG. 3 shows an alternative embodiment of the present invention in which the substrate 20 has a support 21 to provide integrity to the substrate. On the support 21 there is an electrically conductive layer 22. The conductive layer 22 may be a metal or other conductive material such as indium tin oxide (ITO). Where the support is itself a conductor then the conductive layer need not be present. On the conductive layer 22 there is a dielectric layer 23 which is capable of holding an electrostatic pattern image thereon. For instance the dielectric layer 23 may be a photoconductor. The outer surface 24 of the dielectric layer 23 can directly provide a reactive layer for deposition and/or reaction for which the substrate is used. This arrangement is useful where the dielectric layer 23 is not susceptible to attack by the materials of the emulsion used for chemical or physical reactions on the surface.

Figure 4:
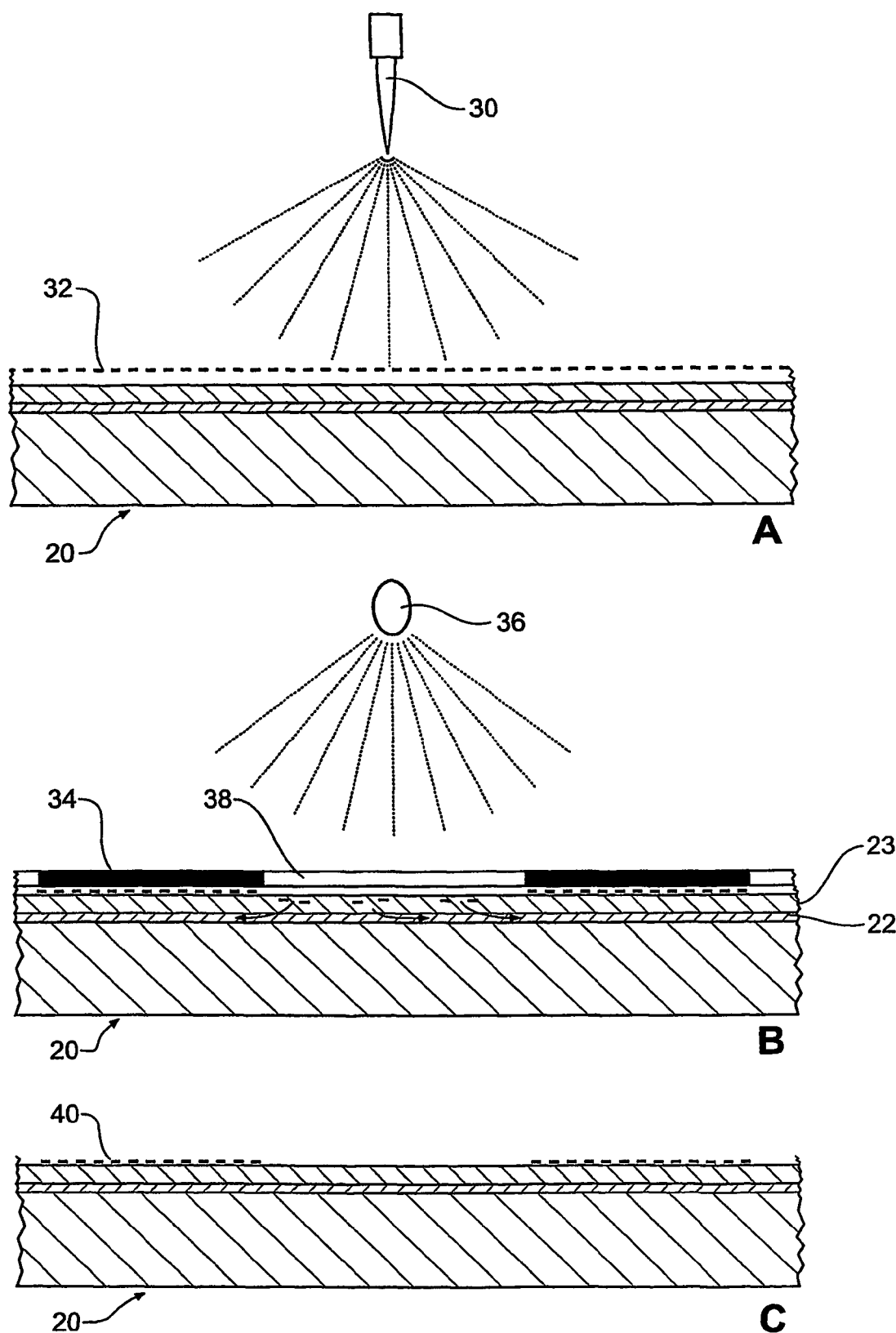
FIG. 4 shows one method by which a substrate according to the present invention may be selectively electrostatically charged in preparation for deposition using an emulsion.

FIG. 4 shows one method by which a substrate of the type shown in FIG. 3 and according to the present invention may be charged for the deposition of chemicals using an emulsion. In this arrangement the substrate 20 is charged with a single point corona discharge device 30 to give a uniform charge pattern 32 on the substrate (FIG. 4A). A mask 34 is then held over or placed onto the substrate and a light 36 shone onto the mask 34 (FIG. 4B). Where there are transparent portions 38 in the mask 34 the photoconductive layer 23 becomes conducting and the charge pattern in those areas is dissipated to the conductive layer 22. This leaves an electrostatic charge pattern 40 in the unexposed areas (FIG. 4C) and it is to these areas that the droplets of the discontinuous phase can be attracted in a subsequent deposition step if they are positively charged.

Figure 5:
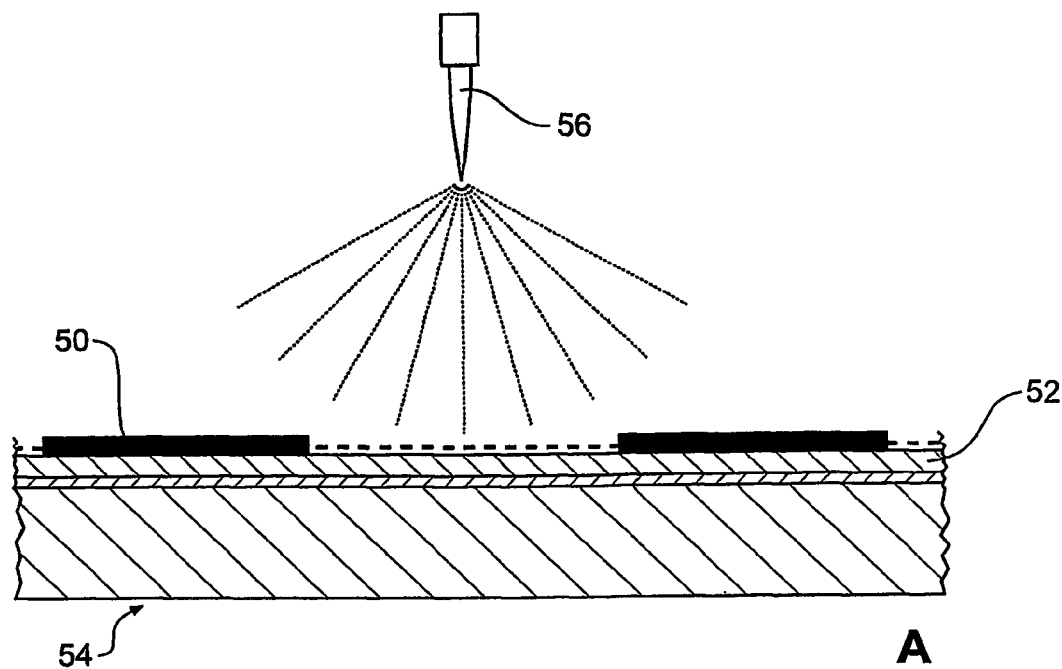
FIG. 5 shows an alternative method by which a substrate according to the present invention may be selectively electrostatically charged in preparation for deposition using an emulsion.
Figure 5:
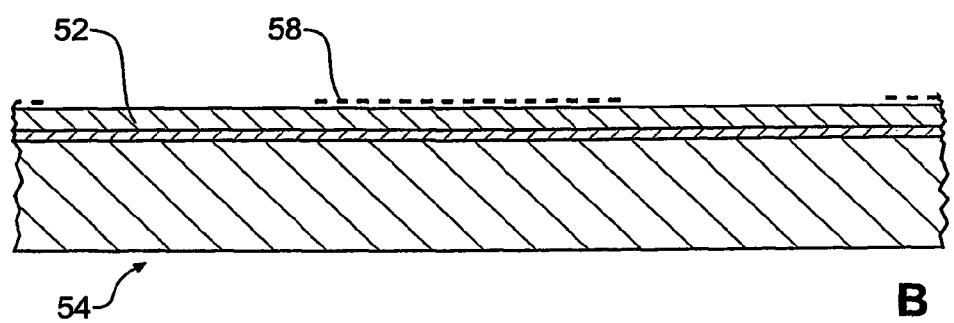

FIG. 5 shows an alternative method by which a substrate according to the present invention may be charged for the deposition of chemicals using an emulsion. In this arrangement the layer 52 is a dielectric material. A metal or other conducting mask 50 is held over or placed onto the substrate 54 and then the substrate is charged with a single point corona discharge device 56 (FIG. 5A). This gives a charge pattern 58 on the dielectric layer 52 of the substrate 54 in those areas in which there are apertures in the mask and it is to these areas that the droplets of the discontinuous phase are attracted if they are positively charged (FIG. 5B).

Negatively charged emulsion droplets will deposit on areas of the surface where the negative charge is absent preferably with the assistance of a bias voltage plate.

Figure 6:
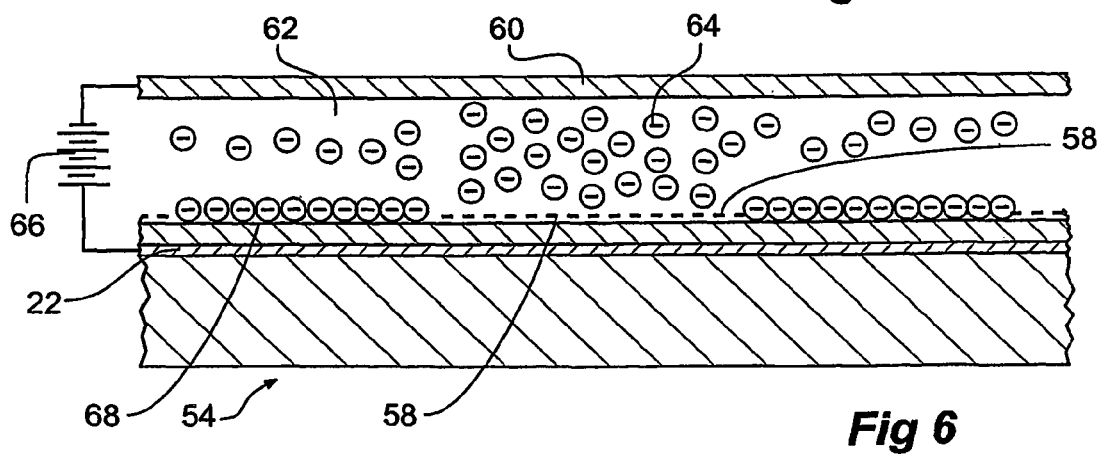
FIG. 6 shows the use of the substrate of the present invention in a selective reversal deposition process.

This arrangement is shown in FIG. 6. In this case the substrate 54 has had negatively charged regions 58 formed upon it by the methods shown in FIGS. 4 and 5 for instance. A bias voltage plate 60 has been brought up to near the substrate 54 with an emulsion 62 with negatively charged droplets 64 in it. A negative voltage is placed onto the bias plate with respect to the conductive layer 22 by power supply 66. The negatively charged droplets 64 are forced down to the neutral regions 68 between the negatively charged regions 58. This process may be termed reversal deposition.

Examples of Chemically Functional Layers

Robust photoconductive surfaces may be functionalised with mono-molecular films to enable covalent attachment of additional chemistries to them. Cadmium sulphide may be modified with mercaptans as a means of attaching functional chemistries. Surface modification of cadmium sulphide may be achieved by immersing a portion of the photoconductor in a solution containing 0.375% (v/v) 3-mercaptopropyl trimethoxy silane in acetone for 15 minutes at room temperature. After rinsing the cadmium sulphide with 95% ethanol/water excess alcohol is drained off and the sample air-dried for 5 minutes, then baked at 110 degrees C. for 15 minutes. In an alternative process the surface of cadmium sulphide was modified by prolonged immersion in glutathione. Cadmium sulphide samples were soaked in 10 mM aqueous glutathione with and without 0.35% nitric acid for 24 hours, and subsequently assessed for changes in water contact angle. In a further example, cadmium sulphide samples were soaked in 10 mM glutathione in dimethylformamide, with and without 0.35% nitric acid for 24 hours, and changes in surface chemistry inferred from changes in water contact angle.

Cadmium sulphide was supplied by Stork Bedford BV, Bedford, Mass. USA

Glutathione was supplied by Sigma-Aldrich Corporation, USA

Such mono-molecular films can subsequently form the substrate for additional chemistries carried out on the surface of the photoconductor.

Experiments were carried out to show that substrate surfaces could be coated with a chemically functional layer and;
  that the presence of oligodeoxynucleotides (with chemical blocking groups on) on a dielectric surface do not prevent it from accepting a charge pattern;
  that a pre-made oligodeoxynucleotide (with blocking groups removed) can be deposited in a spatially defined pattern without affecting volume resistivity;
  that a photoconductor surface can be modified so as to have chemicals (oligodeoxynucleotides) bonded to it in spatially defined patterns.

In an experiment to demonstrate that the presence of in situ synthesised oligodeoxynucleotides on a surface would not compromise the ability of that surface to hold a charge pattern, images were formed on glass surfaces on which had been synthesised oligodeoxynucleotides comprising $(dT)_{12}$ and $(dT)_{25}$. Glass coverslips (24 mm×50 mm×0.13 mm) were sandwiched into a reaction chamber comprising a front of Perspex™ and a back of polypropylene. The volume of the chamber (0.2 ml to 0.4 ml) was defined by gaskets cut from silicon rubber sheet with holes machined through the polypropylene to enable entry and exit of reagents. Entry and exit ports were designed so that the reaction block could be fitted in-line in an Applied Biosystems 394 DNA/RNA synthesiser, in place of a standard oligo-synthesis column.

Coverslips were cleaned in a solution containing 0.1% Pyroneg™, 1% NaOH and 10% ethanol, rinsed exhaustively with Milli Q™ water, before being dried at 110 degrees C. immediately prior to use. For synthesis of a silane chemically functional layer, coverslips were immersed in a solution of 5% glycidoxypropyl trimethoxysilane in toluene for 30 minutes at room temperature, rinsed with toluene and baked at 110 degrees C. for 30 minutes. The glycidoxy ring was opened to facilitate reaction with phosphoramidites by incubation in 0.5M HCl for 30 minutes. Once in the reaction chamber, coverslip surfaces were subjected to standard synthesis cycles of the ABI 394 for synthesis of $(dT)_{12}$ and $(dT)_{25}$.

On removal from the reaction chamber charge patterns were formed on the coverslips using a single point corona and mask and the charge patterns were developed using a particulate electrostatic liquid toner. The presence of strong images in the regions on which $(dT)_{12}$ and $(dT)_{25}$ oligomers had been synthesised confirmed that their presence did not compromise the ability of the dielectric surface to hold a charge pattern.

Further experiments demonstrated that pre-made oligodeoxynucleotides could be incorporated into emulsions and be deposited in pre-determined patterns, confirming that their presence in an emulsion would not interfere with the volume resistivity of the continuous phase, and that they would react chemically with the surface to bind there.

A 29-mer dye-labelled amino oligodeoxynucleotide of base sequence comprising in part the phage lambda single stranded tail was purchased from GeneWorks (Thebarton, South Australia), dissolved at 188 mM in Milli Q water and emulsified as a 0.6% (v/v) discontinuous phase in FC40 with Triton X-100 (0.0003% final, w/v) using an ultrasonic probe.

A charge pattern was formed on an CreativeChip® Oligo slide (Eppendorf, Germany) using a single point corona and mask, emulsion applied to the latent image on it and left briefly to drain and dry. Coupling of the oligodeoxynucleotide to the epoxy slide was then done according to manufacturer's instructions, and its presence in the form of the mask pattern confirmed by scanning the slide in a GenePix 4000B (Axon Instruments Inc., Australia)

A similar experiment was done using cadmium sulphide photoconductor on stainless steel support. The surface of the cadmium sulphide was first silanised with mercaptopropyl trimethoxysilane, then with glycidoxypropyl trimethoxysilane (both from Sigma-Aldrich Inc), and ring-opened with 0.5M HCl (as above). The modified cadmium sulphide was charged negatively through a mask using a multipin corona discharge in darkness to create a latent image on its surface. An emulsion of the same composition as in the previous example was deposited on the surface, and subjected to the "coupling" procedure recommended by Eppendorf for its CreativeChip® Oligo slides. Coupling of the oligodeoxynucleotide to the slide was confirmed by scanning the slide in a GenePix 4000B (Axon Instruments Inc.), and identifying the mask pattern of oligodeoxynucleotides coupled chemically onto the photoconductor surface. For some applications the photoconductive surface may benefit from the presence of a layer conferring adequate resistance to the chemicals typically used in oligodeoxynucleotide synthesis.

Acrylate resins from the Sartomer™ range can be useful in providing such chemical resistance, by combining a bisphenol A epoxide diacrylate oligomer such as CN120A60 or CN120A75 with di-, tri- or tetra-acrylate or methacrylate monomers such as SR306, SR350, SR351 or SR355 and a photoinitiator such as benzophenone or from the Irgacure™ range of alpha-hydroxyketones such as Irgacure 184, Irgacure 2959 or Irgacure 1173, or to include a photoinitiator of the bisacyl phosphine oxide type as in the blend Irgacure 1800. Polymerisation of the acrylate blend may then be initiated by irradiation with ultraviolet light.

Sartomer™ products were supplied by the Sartomer Company, USA.

Benzophenone was supplied by Ajax Chemicals, Australia.

Irgacure products were supplied by Ciba Speciality Chemicals Inc, Basel, Switzerland.

Typically a photoinitiator is incorporated in the range 1-20% (w/w), an oligomer at 0-99% (w/w), and di-, tri- or tetra-acrylate monomers at 0-99% (w/w). Dissolution of solid materials may be encouraged by heating the blends to 55 degrees C. Spreading of the blend evenly across the surface can be accomplished using a spin coater (P-6000 Specialty Coater, Model P-6204-0, Specialty Coating Systems Inc., Indianapolis, USA), with speeds between 500 rpm and 8,000 rpm and durations up to 15 minutes, with spin-speed and duration dependent on viscosity of the acrylate and desired thickness of coating. Curing is achieved by exposure to a source of ultraviolet radiation, typically by placing the spin-coated samples at distances ranging from 3-5 cm from fluorescent tubes emitting UV, such as found in a hand-held UV illuminator (UVP, San Gabriel, Calif., USA), or a transilluminator (Fotodyne, USA) for up to 1 hour.

Such chemically resistant coatings can subsequently form the substrate for additional chemistries carried out on the surface of the photoconductor.

The use of the substrate of the present invention for the manufacture of DNA arrays will now be discussed.

The substrate of the present invention may be used for a range of solid phase chemical reactions where it is desired to react on the substrate in a spatially selective manner.

In one embodiment the substrate may be used in a method of forming a solid phase chemical array on the substrate using a stepwise reaction process, the method including the steps of:

(a) defining at least one region on the substrate by forming an electrostatic charge on that region which is different from the electrostatic charge on other regions of the substrate such as by formation of a latent electrostatic image thereon, (b) applying an emulsion to the substrate, the emulsion having the electrically charged discontinuous phase droplets and a chemical reagent carried in or comprising the discontinuous phase, (c) attracting the discontinuous phase of the emulsion to the at least one preselected region by attraction by the electrostatic charge on the region and optionally by the use of a background bias voltage to reduce deposition in non-required regions, (d) causing a chemical reaction in the at least one region, (e) removing the emulsion, and (f) carrying out subsequent steps of the stepwise reaction process.

In an alternative embodiment it may be used in a method of forming a DNA array on the substrate using a stepwise coupling process with a chemical de-protecting step prior to each coupling step, the method including the steps of:

(g) preparing a substrate with surface functional groups protected by a removable protecting group;

(h) defining at least one region on the substrate by forming an electrostatic charge on that region which is different from the electrostatic charge on other regions of the substrate such as by formation of a latent electrostatic image thereon, (i) applying an emulsion to the substrate, the emulsion having the electrically charged discontinuous phase droplets and a chemical de-protecting reagent carried in the discontinuous phase as discussed above, (j) attracting the discontinuous phase of the emulsion to the at least one preselected region by attraction by the electrostatic charge on the region and optionally by the use of a background bias voltage to reduce deposition in non-required regions, (k) causing chemical de-protecting in the at least one region, (l) removing the emulsion, and (m) carrying out subsequent steps of the stepwise coupling process.

The subsequent steps of the stepwise coupling process may be such as those that are carried out in the standard phosphoramidite chemistry for synthesis of oligodeoxynucleotides although as discussed earlier the invention is not limited to this particular chemistry.

It will be realised that the process as discussed above may be repeated a sufficient number of times to synthesise selected oligonucleotides of any sequence and length up to at least 100-mer in a predetermined spatial order, position and feature size on the substrate.

The step of defining at least one region on the substrate by forming a latent electrostatic image on that region may include the step of image reversal to cause deposition in non-charged regions.

The formation of the an electric or electrostatic charge may be by electrostatic means such as wherein the substrate is a photoconductor and the formation of the electrostatic field is by electrostatic or other charging and then selective discharge by illumination. Preferably the illumination may not include radiation in the short ultraviolet region when used in relation to DNA manufacture as this may cause damage to the DNA molecule. For the assembly of other chemical chips or arrays, however, UV radiation may be used.

In one preferred embodiment, the stepwise coupling process is the phosphoramidite process which uses chemical de-protecting of a trityl group but the invention is not so limited but may include other stepwise coupling or addition processes.

The step of removing the emulsion may include the step of neutralising any residual chemical de-protecting agent in the emulsion to prevent it from reacting in non-desired parts of the array.

As discussed above, the emulsion for use for the present invention comprises an electrically insulative continuous phase such as a fluorochemical, an aqueous or a non-aqueous discontinuous phase for instance a hydrocarbon oil which carries the chemical de-protecting agent in it in solution, with preferably a surfactant and preferably a charge control agent.

The continuous phase may be selected from hydrocarbons such as hexane, cyclohexane, iso-octane, heptane, decalin, aromatic hydrocarbons and isodecane and commercially available mixtures of hydrocarbons such as the Isopars™ and Norpars™ made by Exxon. The continuous phase may also be selected from fluorochemicals including fluorocarbon compounds. These fluorochemicals generally comprise from 2 to 16 carbon atoms and include, but are not limited to, linear, cyclic or polycyclic perfluoroalkanes, bis(perfluoroalkyl)alkenes, perfluoroethers, perfluoroalkylamines, perfluoroalkyl bromides and perfluoroalkyl chlorides such as the Fluorinerts™ made by 3M. The continuous phase may also be selected from silicone fluids such as polyphenylmethyl siloxanes (PMMS), dimethyl polysiloxanes, polydimethyl siloxanes, cyclic dimethyl siloxanes and the like.

Where the discontinuous phase is a hydrocarbon oil, the chemical de-protecting agent may be a strong protic organic or inorganic acid.

The non-aqueous discontinuous phase which carries the chemical de-protecting agent may be selected from acetone, acetonitrile, cyclohexanone, decalin, dibromomethane, dichloromethane (methylene chloride, DCM), trichloromethane, dimethyl formamide (DMF), dioxane, 1,2-dichloroethane (DCE), nitromethane, tetrahydrofuran, toluene, dimethyl formamide, isobutanol, propylene carbonate, dimethyl sulphoxide, commercially available mixtures of hydrocarbons such as the Isopars™ and Norpars™ made by Exxon or mixtures of compounds such as isopropanol/methylene chloride, nitromethane/methanol, nitromethane/isopropanol, trichloromethane/methanol or isopropanol/methylene chloride.

The chemical de-protecting agent may be a Lewis acid or a protonic acid. The Lewis acid may be selected from but not restricted to zinc bromide, titanium tetrachloride, and ceric ammonium nitrate while dilute protonic acids which can be used include, but are not limited to, dilute mineral acids, trichloroacetic acid (TCA), dichloroacetic acid (DCA), benzenesulphonic acid, trifluoroacetic acid (TFA), difluoroacetic acid, perchloric acid, orthophosphoric acid and toluenesulphonic acid. Other acids may include dodecylbenzene sulphonic acid, dinonylnaphthyldisulphonic acid (DNNDSA), dinonylnaphthylsulphonic acid (DNNSA), perfluorooctanoic acid (PFOA) and diphenyl acid phosphate.

This then generally describes the invention but to assist with understanding, reference will now be made to examples of emulsions used on substrates according to the present invention.

Example of Spatially Selective Deposition of a Charged Emulsion onto a Substrate An experiment was carried out to determine whether a charged emulsion would deposit on a substrate with an electrostatic image pattern formed thereon. For this purpose an emulsion was formed with an insulative continuous phase and a discontinuous phase which included a dye.

For this purpose an emulsion was formed with an insulative continuous phase and a discontinuous phase which included an acid and a substrate comprising a zinc oxide photoconductor was charged with a negative pattern. The photoconductor was dip-coated with a solution of Butvar 72 (1% w/v) and the pH indicator methyl orange (at saturation) in cyclohexanone, and dried at 55 degrees C. for 30 minutes:

The emulsion comprised the following:

| | | |
|---|---|---|
| Continuous phase | FC40 | 0.89 ml |
| Discontinuous phase | 5% dichloroacetic acid (w/v) in toluene | 0.1 ml |
| | F6H14 (1% in FC40, v/v) | 0.01 ml |

F6H14 is a semifluorinated allylalkane, 1-(perfluoro-n-hexyl) tetradecane, manufactured by Apollo Scientific Ltd, UK.

Butvar 72 is polyvinyl butyral manufactured by Solutia.

Zinc oxide photoconductor was supplied by Applied Research of Australia Pty Ltd and comprised zinc oxide bound with an insulative resin coated onto a PET aluminium metalised film.

It was found that the discontinuous phase deposited only in the area of the charge pattern releasing the dichloroacetic acid to react with the methyl orange giving a pH-dependent colour change from yellow to pink.

While this solid phase combinatorial chemistry synthesis process has been discussed in relation to the phosphoramidite process it is to be realised that the process is also applicable to other processes which use a stepwise addition process with a chemical protection or de-protecting step or a chemical activation or deactivation step, derivatisation step or coupling step on a substrate. Indeed it is possible that the activated amidites could be selectively electrostatically deposited onto a completely de-protected substrate.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A substrate adapted for selective micron and nanometer scale deposition, the substrate having;
    a support;
    a conductive layer on the support;
    a dielectric layer of a material which will hold an electrostatic charge, the dielectric layer disposed on the conductive layer; and
    a continuous chemically functional layer on the dielectric layer, the chemically functional layer providing both a protective layer for the dielectric layer and a chemically reactive surface for compounds deposited on the surface;
    wherein the chemically functional layer prevents liquids and the compounds deposited on the surface from accessing the dielectric layer; and
    wherein the substrate is capable of having electrostatic charge patterns formed in a predetermined manner thereupon or therein.

2. A substrate as in claim 1 wherein the support is selected from the group comprising a metal, glass, ceramic, or polymeric material and the support is clear or opaque and flexible or rigid.

3. A substrate as in claim 1 wherein the conductive layer is combined with the support.

4. A substrate as in claim 1 wherein the conductive layer is a very thin layer and is transparent.

5. A substrate as in claim 1 wherein the conductive layer is vacuum-deposited onto the support.

6. A substrate as in claim 1 wherein the conductive layer is selected from the group comprising a sputtered layer of metal or indium tin oxide, or a carbon nano-tube layer.

7. A substrate as in claim 1 wherein the dielectric layer comprises a material selected from the group consisting of a glass, a polymeric resin and a methylmethacrylate (MMA).

8. A substrate as in claim 1 wherein the dielectric in the dielectric layer comprises a photoconductor.

9. A substrate as in claim 8 wherein the photoconductor is selected from the group comprising zinc oxide, cadmium sulphide, lead sulphide, lead selenide, amorphous selenium, doped selenium, alloys of selenium including selenium-tellurium, selenium-arsenic, organic photoconductive materials.

10. A substrate as in claim 1 wherein the chemically functional layer comprises a material selected from the group consisting of a silane polymer, silicon dioxide, silicon nitride ($Si_xN_y$), titanium dioxide, organic titanates and zirconates, cross-linked or partially cross-linked epoxy novolac resins, polymerised oligomers, cross-linked resins, functionalised parylene (a polymer of di-para-xylyene), acrylates and methacrylates which may include functional groups, multi-functional acrylates and methacrylates, and monomers which have been crosslinked with a photoinitiator.

11. A substrate having;
    a support;
    a conductive layer on the support;
    a photoconductive layer of a material which is adapted to have an electrostatic charge thereon selectively dissipated upon receiving incident radiation, the photoconductive layer disposed on the conductive layer; and
    a continuous chemically functional layer on the photoconductive layer, the chemically functional layer providing both a protective layer for the photoconductive layer and a chemically reactive surface for compounds deposited on the surface;
    wherein the chemically functional layer prevents liquids and the compounds deposited on the surface from accessing the photoconductive layer; and
    wherein the substrate is capable of having electrostatic charge patterns formed in a selected array thereupon to influence the movement of charged droplets in a liquid medium on the substrate.

12. A substrate adapted for manufacture of DNA arrays, the substrate having;
    a support;
    a conductive layer on the support;
    a photoconductive layer of a material which is adapted to have an electrostatic charge thereon dissipated upon receiving incident radiation, the photoconductive layer disposed on the conductive layer; and
    a continuous chemically functional layer on the photoconductive layer, the chemically functional layer providing a protective layer for the photoconductive layer;
    wherein the chemically functional layer prevents liquids and compounds deposited on the chemically functional layer from accessing the photoconductive layer; and wherein the substrate is capable of having electrostatic charge patterns formed in a selected array thereupon to influence the movement of charged droplets in a liquid medium on the substrate;

the chemically functional layer comprising at least in part a chemically active material to which a molecule can be attached, the molecule being selected from the group consisting of a binder molecular and a binder molecule with at least one DNA oligomer joined thereto, whereby the substrate is capable of having a selected electric charge pattern generated thereupon by incident radiation to enable selective chemical de-protection of the binder molecule or the at least one DNA oligomer already joined to the binder molecule.

13. A substrate adapted for manufacture of DNA arrays, the substrate having;

a support;

a conductive layer on the support;

a photoconductive layer of a material which is adapted to have an electrostatic charge thereon selectively dissipated upon receiving incident radiation, the photoconductive layer disposed on the conductive layer; and a continuous chemically functional layer on the photoconductive layer, the chemically functional layer providing a protective layer for the photoconductive layer;

wherein the chemically functional layer prevents liquids and compounds deposited on the chemically functional layer from accessing the photoconductive layer; and wherein the substrate is capable of having electric charge patterns formed in a selected array thereupon to influence the movement of charged droplets in a medium on the substrate; the chemically functional layer providing a surface to which a binder molecule can be attached.

14. A substrate as in claim 9 wherein the organic photoconductive materials comprise polyvinylcarbazole (PVK) or complexes of polyvinylcarbazole sensitised with trinitrofluorenone.

15. A substrate as in claim 1 wherein the continuous chemically functional layer is disposed on substantially the entire dielectric layer.

16. A substrate as in claim 1 wherein the continuous chemically functional layer is a mono-molecular film.

17. A substrate as in claim 11 wherein the continuous chemically functional layer is disposed on substantially the entire photoconductive layer.

18. A substrate as in claim 11 wherein the continuous chemically functional layer is a mono-molecular film.

19. A substrate as in claim 12 wherein the continuous chemically functional layer is disposed on substantially the entire photoconductive layer.

20. A substrate as in claim 13 wherein the continuous chemically functional layer is a mono-molecular film.

* * * * *

UNITED STATES PATENT AND TRADEMARK OFFICE
CERTIFICATE OF CORRECTION

PATENT NO. : 8,609,178 B2  Page 1 of 1
APPLICATION NO. : 10/562371
DATED : December 17, 2013
INVENTOR(S) : Hastwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1586 days.

Signed and Sealed this
Twenty-second Day of September, 2015

Michelle K. Lee
*Director of the United States Patent and Trademark Office*